Patented Sept. 17, 1940

2,214,771

UNITED STATES PATENT OFFICE 2,214,771

FLAT VARNISH

Herbert E. Miles, Lakewood, Ohio, assignor to The Glidden Company, Cleveland, Ohio, a corporation of Ohio No Drawing. Application June 28, 1938, Serial No. 216,323

20 Claims. (Cl. 134—26)

The present invention relates to the production of flat varnishes.

Flat varnishes have been produced by the addition of inorganic pigments such as magnesium carbonate, amorphous silica, etc. These flats have the disadvantage that the pigment settles out. It is also frequently desirable to use a clear flat, and such pigmented materials are not wholly suitable in such cases. The use of insoluble soaps as flatting agents is also known, aluminum stearate being commonly used for this purpose. Other soaps such as zinc and magnesium stearates have been used, but are not as satisfactory as aluminum stearate. Aluminum stearate, however, has the disadvantage of precipitating out and causing production of soft cheesy films. If during the grinding the aluminum stearate is ground too fine, it goes into solution, and upon cooling of the varnish, the soap precipitates out. Also, it is difficult to get sufficient of the aluminum stearate properly dispersed to give the necessary flatting effect. The use of sufficient amounts of aluminum stearate to give the flatting effect sometimes desired, results in either precipitation of the soap, or excess bodying of the varnish, both of which are undesirable. Aluminum stearate as well as the other soaps mentioned also retard the drying of the varnish.

It has been found that zinc oiticicate, the zinc soap of oiticica oil acids, is an excellent flatting agent and that its use overcomes the disadvantages mentioned above in regard to aluminum stearate. The magnesium, aluminum and calcium salts may also be used but are somewhat more difficult to work with and appear to have no disadvantages over the zinc soap.

In preparing flats using an insoluble soap as the flatting agent, it is important to get proper dispersion of the soap. The soap should not be in solution or partial solution, however, as this destroys its flatting properties, and in many cases is detrimental to the film. There should be no coagulation or separation of the soap as this destroys the film. The soap should be dispersed without solution and without coagulation. The metallic oiticicates, particularly zinc oiticicate, have been found suitable and can be dispersed by various procedures.

The invention may be illustrated by the following examples, but it is not to be considered limited thereto, as other procedures and modifications may be resorted to without departing from the invention.

Example I 50 parts of zinc oiticicate and 50 parts of a rosin modified phenol formaldehyde resin were separately fused, and the molten zinc oiticicate was slowly added to the molten gum at a temperature below 300° F. After the addition of all the soap, the temperature was raised to 280° F., and held for one hour. The material was then allowed to cool. After cooling, 7.5 pounds of the mixture was cut with 1 gallon of a solvent mixture consisting of 6 parts varnolene and 2 parts solvent naphtha, allowing the zinc soap to remain in a finely dispersed condition. This base was then mixed with various varnishes, to produce flat varnishes. The films dried with little slowing down of the drying time, and were clear, tough films, which had dried down like an ordinary varnish film.

Other gums or resins may be used, such as ester gum, phenol formaldehyde resins, rosin, etc., any resin being suitable which has a melting point below 300° F. If more than 300° F. is necessary to melt the resin, the zinc oiticicate will not flatten properly. Also, other insoluble metallic oiticicates may be used in place of zinc oiticicate. The base prepared may be used with various varnishes and in varying amounts. Preferably the amount of soap in the flatting varnish base will vary betweeen 35% and 65%, based on the weight of the resin, the maximum amount which can be used without precipitation being 65%. If less than 35% of the soap is used in this type of flatting base, proper flatting is not obtained, when mixed with other varnish to produce the flat varnish. The amount of the flatting base used with other varnishes to produce the flat varnish will depend upon the degree of flatness desired and the ease of flatting of the particular varnish.

Example II

In this example the molten zinc oiticicate was first thinned in a normally liquid vehicle such as a solvent or varnish in which the soap is insoluble when cool, the temperature being kept above 180° F., the melting point of the soap. After all of the thinner or varnish was added, the mixture was run through a water-cooled colloid mill. As the material is cooled, the soap precipitates out, and as the area of precipitation is small, the particles are of colloidal size or approximate colloidal size. The material may, and preferably is, run through the colloid mill two or three times, being further cooled during each run. This process gives a flatting base which can be mixed with a varnish to flatten it.

As an illustration, 40 parts of molten zinc oiticicate were thinned with 60 parts of varnolene, the temperature being kept above 180° F. until all of the varnolene had been added. After the addition of the varnolene was complete, the solution was run through a colloid mill having two beveled discs, with less clearance at their outer edges than at their centers. The top disc was stationary and the lower one rotated, both being hollow and water-cooled. The material was passed through the mill three times to produce a fine dispersion of the zinc oiticicate, which was then ready for mixing with varnishes.

*Example III*

3 pounds of melted zinc oiticicate to the gallon were taken up in varnolene. The temperature was run up to 190° F., then allowed to cool. The mixture was then ground in a ball mill, the temperature being kept sufficiently low (below 130° F.) to prevent the soap from going into solution. After dispersion was complete, the mixture was mixed with various varnishes in varying amounts in making up a series of flat varnishes. In place of varnolene other solvents can be used such as turpentine, V. M. P. naphtha, etc., any solvent being suitable which when cool will not permanently dissolve the soap.

In all of the flat varnishes made, the zinc oiticicate or other metal soap of oiticica oil were thoroughly dispersed without being in solution, and the soap remained dispersed without coagulation. Also there was no excessive bodying of the varnish, as in the case of aluminum stearate. The varnish bases used were of the conventional types and no particular type is necessary, the results apparently being attainable with any varnish. The flatting varnishes using the insoluble metallic oiticicate soaps, dry with only little slowing down of the drying rate, and produce tough films which dry down like the varnish film without the added flatting agent.

Methods of grinding, other than those mentioned above, may be resorted to, to effect proper dispersion of the oiticicate soap in the vehicle, such as grinding in a burr mill, etc.

Having described my invention, what is claimed and desired to protect by Letters Patent of the United States is:

1. A flat varnish comprising an insoluble metallic oiticicate soap dispersed therein as the flatting agent.

2. A flat varnish comprising zinc oiticicate dispersed therein as the flatting agent.

3. The method of making a flat varnish which comprises incorporating a flatting base having dispersed therein an insoluble metallic oiticicate soap as the flatting agent in a varnish.

4. The method of making a flat varnish which comprises dispersing zinc oiticicate in a varnish in a finely divided condition.

5. A flatting base for flat varnishes comprising a dispersion of zinc oiticicate in a gum.

6. A flatting base for flat varnishes comprising a dispersion of zinc oiticicate in a solvent.

7. A flatting base for flat varnishes comprising a dispersion of zinc oiticicate in varnish.

8. A flatting base for flat varnishes comprising a dispersion of zinc oiticicate in a liquid vehicle.

9. The process of preparing a flatting base for varnish which comprises mixing a molten metallic oiticicate with a vehicle in a liquid state at a temperature below 300° F., and then cooling the mixture below the melting point of the metallic oiticicate.

10. The process of preparing a flatting base for varnish which comprises mixing molten zinc oiticicate with a vehicle in the liquid state at a temperature below 300° F. and then cooling the mixture below the melting point of the zinc oiticicate.

11. The process of preparing a flatting base for varnish which comprises mixing molten zinc oiticicate with a molten gum at a temperature below 300° F., and then cooling the mixture below the melting point of the zinc oiticicate.

12. The process of preparing a flatting base which comprises mixing molten zinc oiticicate with a normally liquid vehicle in which the zinc oiticicate is insoluble when cool, and then cooling the mixture below the melting point of the zinc oiticicate.

13. The process of preparing a flatting base for varnish which comprises mixing molten zinc oiticicate with a normally liquid vehicle in which the zinc oiticicate is insoluble when cool, and cooling the mixture below the melting point of the zinc oiticicate while confining the mixture to a small area.

14. The process of preparing a flatting base for varnish which comprises mixing molten zinc oiticicate with a solvent in which the zinc oiticicate is insoluble when cool, and cooling the mixture below the melting point of the zinc oiticicate.

15. The process of preparing a flatting base for varnish which comprises mixing molten zinc oiticicate with a solvent in which the zinc oiticicate is insoluble when cool, and cooling the mixture below the melting point of the zinc oiticicate while confining the mixture to a small area.

16. The process of preparing a flatting base for varnish which comprises mixing molten zinc oiticicate with a solvent in which the zinc oiticicate is insoluble when cool, cooling the mixture below the melting point of the zinc oiticicate, and ball milling the mixture.

17. The process of preparing a flat varnish which comprises mixing a molten metallic oiticicate with a vehicle in the liquid state at a temperature below 300° F., cooling the mixture below the melting point of the metallic oiticicate, and mixing the cooled mixture with a varnish.

18. The process of preparing a flat varnish which comprises mixing molten zinc oiticicate with a molten gum at a temperature below 300° F., cooling the mixture below the melting point of the zinc oiticicate, and mixing the cooled mixture with a varnish.

19. The process of preparing a flat varnish which comprises mixing molten zinc oiticicate with a normally liquid vehicle in which the zinc oiticicate is insoluble when cool, cooling the mixture below the melting point of the zinc oiticicate, and mixing the cooled mixture with varnish.

20. The process of preparing a flat varnish which comprises mixing a molten metallic oiticicate with a solvent in which the metallic oiticicate is insoluble when cool, cooling the mixture below the melting point of the metallic oiticicate, grinding the mixture and mixing the cooled and ground mixture with a varnish.

HERBERT E. MILES.